3,446,482
LIQUID COOLED TURBINE ROTOR
Paul H. Kydd, Scotia, N.Y., assignor to General Electric
Company, a corporation of New York
Filed Mar. 24, 1967, Ser. No. 625,837
Int. Cl. F01d 5/08, 5/18, 25/12
U.S. Cl. 253—39.15        18 Claims

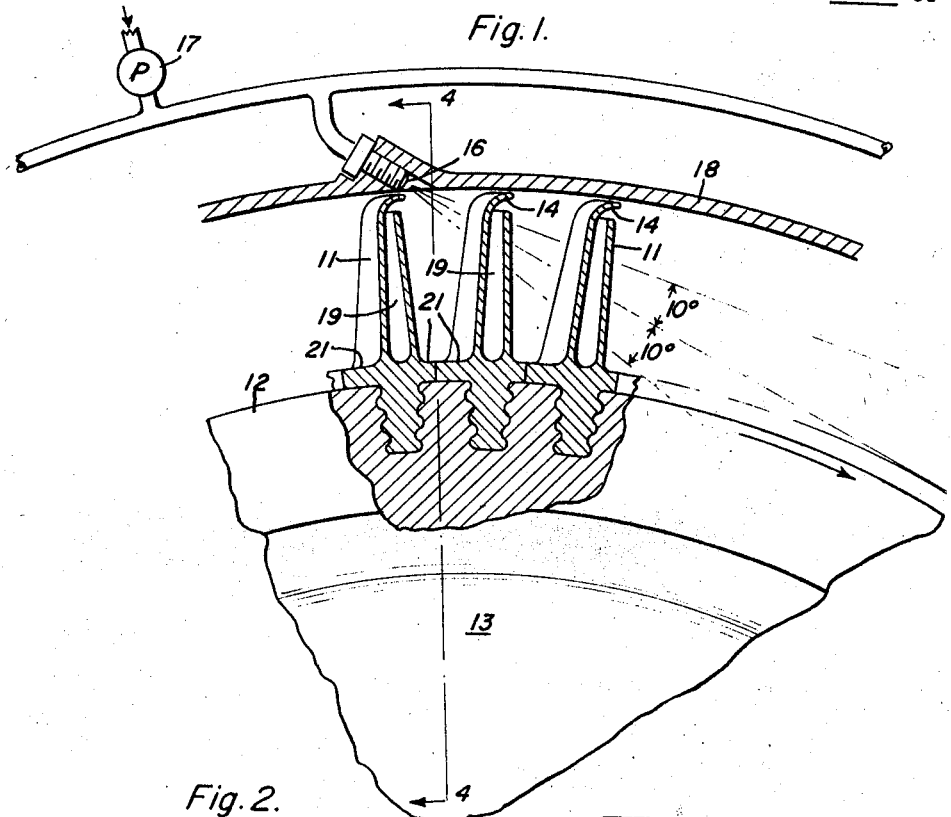
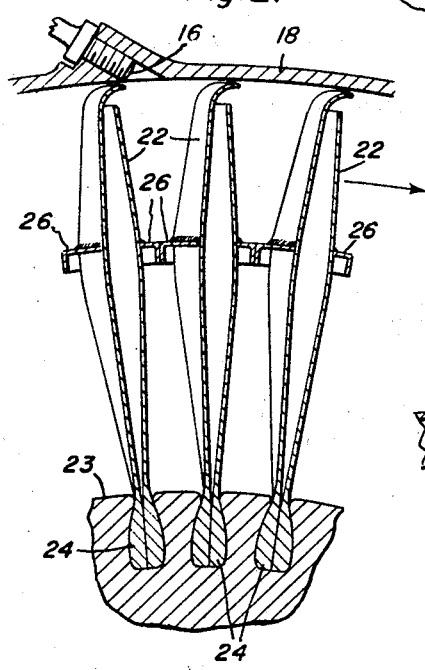
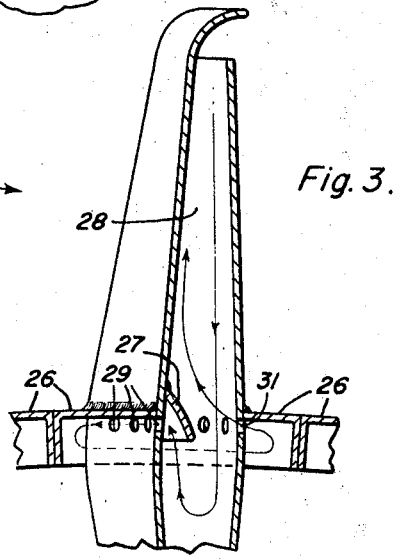

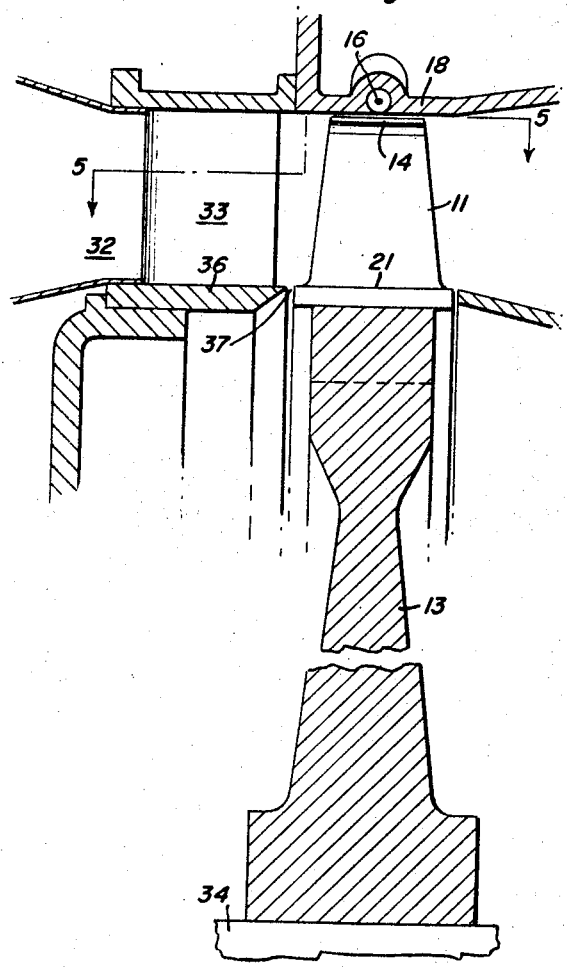
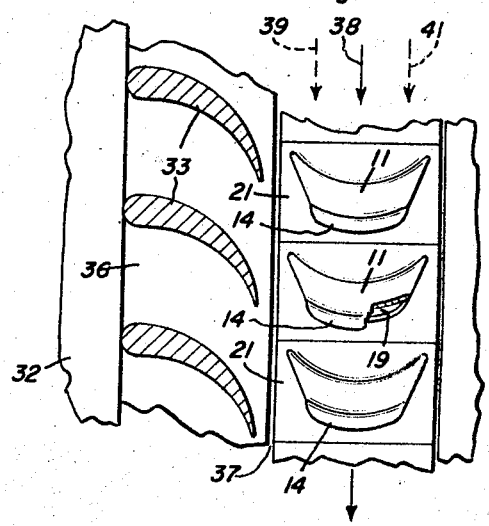
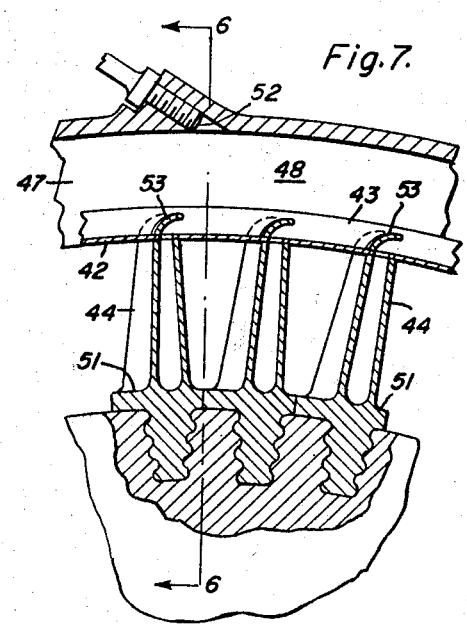
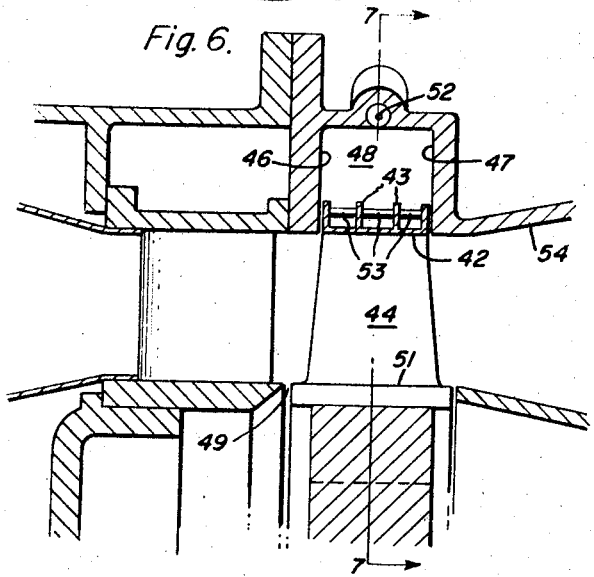

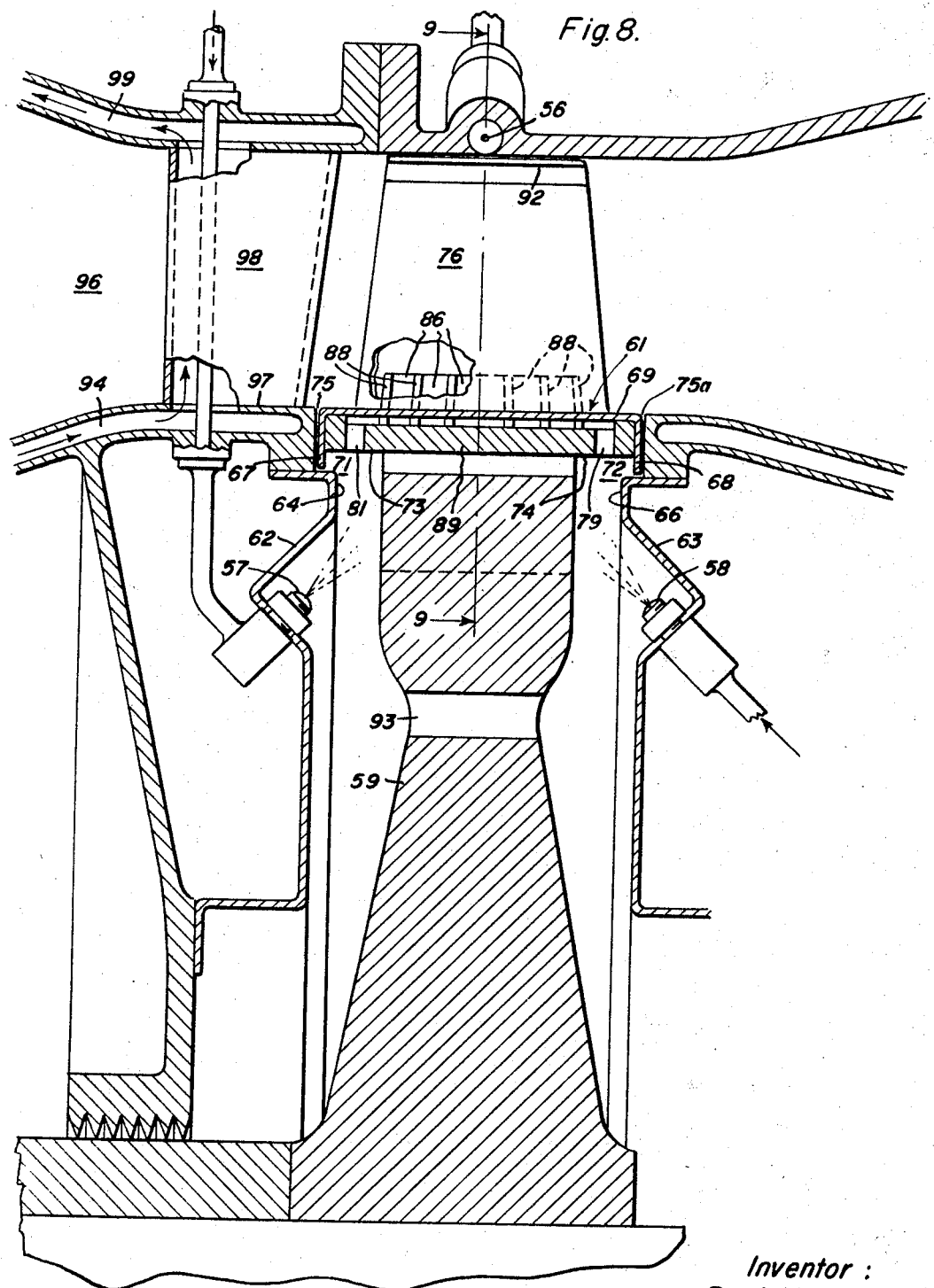

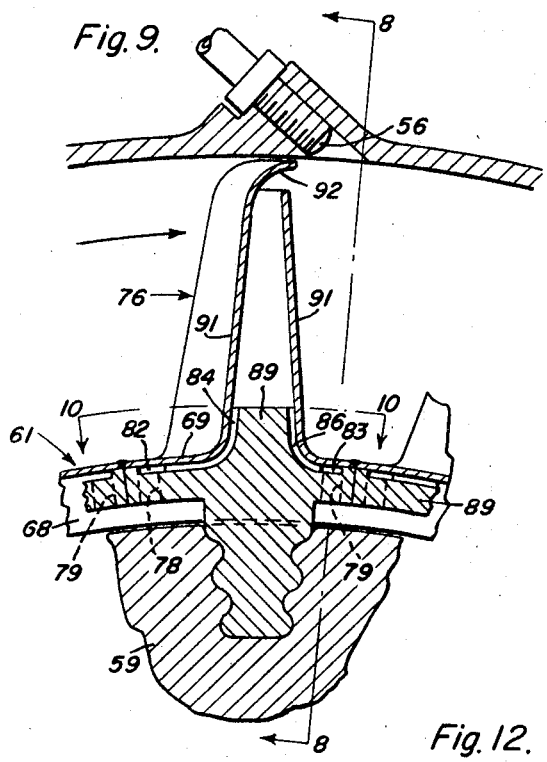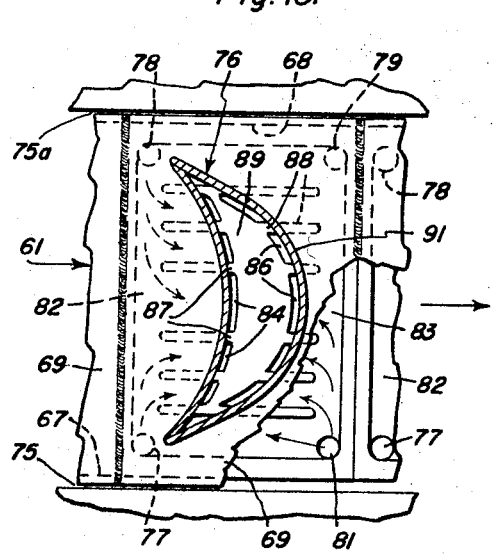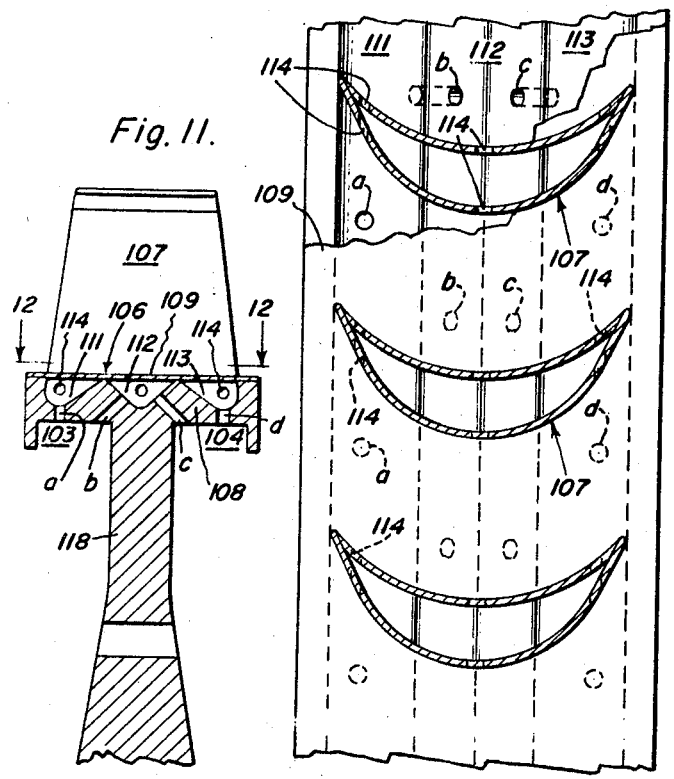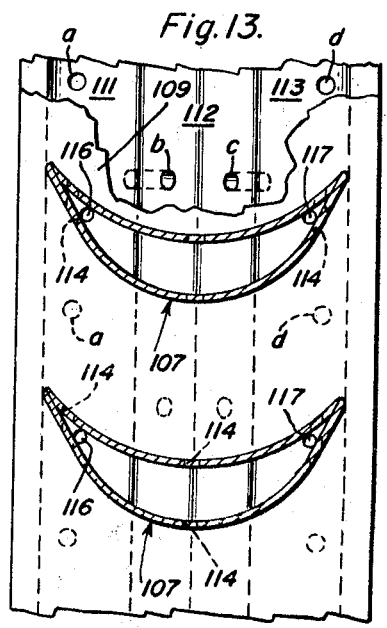

ABSTRACT OF THE DISCLOSURE

A structural arrangement is shown for liquid cooling of gas turbine buckets, the liquid being directed inwardly from the turbine casing by a plurality of stationary spray nozzles and then being urged into the interior of the buckets at least in part by scoops disposed adjacent the distal end of each bucket.

Also, the aforementioned cooling arrangement is described in combination with the distribution of cooling liquid from within the turbine to cool the rotor disc rim and the bucket platforms as well as the buckets, themselves.

---

The portions of a gas turbine in which the need for cooling is the most critical are the combustor, the turbine nozzles and the turbine buckets. The most difficult cooling problem is posed by the latter, because they are mounted on the turbine rotor disc, a rotating element. A further difficulty arises from the fact that not only do the turbine buckets have thin trailing edges, but the leading edges are also sharp. Since the heat loads on these thin sections are very severe the cooling must be highly uniform and effective to present large temperature gradients and associated thermal stresses. In addition, the problems of introducing aligned coolant into, and removing coolant from, the high-speed rotor disc without entailing excessive leakage of coolant, are formidable ones, because of the tremendous centrifugal and Coriolis forces encountered.

Compressed air is the most readily available coolant and the one most easily introduced into the rotor structure. Usually compressor discharge air is conducted to the roots of the turbine buckets and discharged through radially-extending holes in the buckets passing along the span thereof. When distributed in this manner, cooling is effected by convection and, since air has a rather low heat capacity and is normally available only at an elevated temperature in high compression machines, its value as a coolant is low, and yet, its cost in terms of lost compressive power is high. The maximum turbine inlet temperature that may be employed in gas turbine units relying upon convection air cooling is about 1400° K. (2050° F.).

Air may be employed still more effectively as a cooling medium when applied in transpiration cooling wherein the air is injected from within the bucket into the boundary layer of hot gas, which passes over the surface of the turbine buckets. The injection of the air is accomplished by passing the air through many fine holes extending through the bucket shell and thereby provides an insulating air layer between the surface of each turbine bucket and the hot gases. Unfortunately, this cooling technique is difficult in that it necessitates the drilling of a large number of fine holes in intricate superalloy castings, which drilling increases the cost of the turbine buckets considerably.

Convection cooling by the use of gases other than air, as for example hydrogen, helium or steam, provides better heat transfer inside the turbine buckets, because of the increased thermal conductivity of such gases, however, such a system must be maintained absolutely gas-tight thereby posing an extremely difficult design problem in addition to that of disposing of the heat once it has been transferred to the gas cooling medium.

The amount of heat which must be removed from the turbine buckets and adjacent supporting structure is determined by both the film coefficient and the extend of the area of the surfaces being cooled. For this reason, it is preferable to reduce the surface area to be cooled and to increase the loading on each turbine stage beyond the values of stage loading now employed in conventional gas turbines.

In order to attain high stage loading with high operating efficiency, the peripheral speed of the turbine rotor must be increased, and this increase in turn increases the centrifugal stress on the turbine buckets. Any such increase in centrifugal stress can be accommodated only by reducing the temperature of the turbine buckets well below that temperature normally tolerated in gas turbine practice at which lower temperature the bucket material has substantially higher strength. Assuming that this temperature reduction can be effected, the heat load per stage can be increased, because of the higher relative velocities and the larger temperature difference employed, while the total heat load is reduced by reducing the number of turbine stages. Cooling the turbine buckets by transpiration sufficiently to retain for the entire turbine rotor a strength in the order of 100,000 p.s.i. would require such a large amount of cooling air that a serious reduction in aerodynamic efficiency would result. Obviously, cooling by convection with gases cannot possibly produce the requisite cooling capacity. However, convection may be successfully employed providing very high heat transfer coefficients can be obtained and such high heat transfer coefficients can be obtained by the use of liquid cooling.

Liquid cooling of gas turbines is broadly old, both forced and natural convection water-cooled turbines having been tested. One early attempt used hollow turbine rotors with "blind" holes extending radially outwardly into the turbine buckets to within a very short distance of the tips. Another approach has employed the distribution of liquid via radially directed bores to circumferentially extending cooling channels in the rotor disc rim with a return flow via a second set of radially directed bores. Still another approach has been the distribution of liquid from a supply thereof near the rotor axis to a rim manifold for redistribution therefrom to injection orifices venting through the rim into the hot gases to the suction side of each bucket. Sprays of the cooling liquid ejected thereby contact the exterior bucket surfaces. Unfortunately, each of the above proposals has presented serious difficulties in construction and in maintenance, the maintenance problems being due to the plugging up of conduits with deposits of foreign matter and the consequent building up of undesirably high liquid pressures.

It is, therefore, an object of this invention to provide means for effecting moderate cooling of open-ended gas turbine buckets by directing liquid inward from the turbine casing, said cooling means being selectively useable in combination with second cooling means for simultaneously distributing cooling liquid within the turbine in a generally radially-outward direction to very substantially increase the cooling capability and, thereby, the turbine inlet temperature.

It is another object of this invention to provide a relatively simple device for cooling gas turbine buckets sufficiently to enable increasing the turbine inlet temperature to at least about 2100° F. thereby obtaining an increase in power output of about 40% and an increase in thermal efficiency of about 15%.

A further object of this invention is the provision of a method for the liquid cooling of open-ended gas turbine buckets by injecting the liquid inwardly of the casing, this liquid then being driven into the interior of the buckets, which method permits a cooling capacity of intermediate degree readily adapted to augmentation upon demand with cooling from a second source.

The aforementioned and other objects are achieved for moderate bucket tip speeds (less than about 1500 feet per second) and radius ratios (radius of bucket tip/ radius of bucket root) by spraying a cooling liquid, preferably water, into the interior of open-ended buckets which are hollow, or which have radially extending passages therein, pump means being supplied to accelerate the water up to a velocity within about 500 feet per second (f.p.s.) of the full peripheral speed of the turbine buckets and the water injecting nozzles being adjusted to direct the water inwardly in a solid stream from the casing at the proper angle such that the extended line of travel of the water stream would be tangent to the outer rim of the rotor discs or within about $\pm 10°$ of being tangent thereto. Entry of the water into the interior of the turbine buckets is accomplished by a scoop located along or adjacent the lip of each bucket on the pressure side.

In the case of gas turbines operating at moderate peripheral speeds and at temperatures in excess of about 2100° F. the aforementioned inwardly directed water spray may be selectively or automatically augmented by the simultaneous introduction of water from an internal spray cooling arrangement wherein the water is sprayed in a generally radially outward direction onto the side(s) of the moving rotor disc from a plurality of stationary spray nozzles. Confining circumferentially extending means for defining a gutter is provided on at least one side of the rotor disc under the bucket platform projections to receive and collect the injected water to bring it up to rotational speed and permit dispersal therefrom under centrifugal force to and outwardly through each open-ended turbine bucket.

By employing this combination of liquid spray cooling arrangements very efficient, highly controllable cooling of the turbine disc rim, bucket platforms and buckets may be obtained, permitting operation of the turbine at considerably higher turbine inlet temperatures required for stoichiometric firing.

The exact nature of this invention as well as other objects and advantages thereof will be readily apparent from consideration of the following specification relating to the annexed drawings in which:

FIG. 1 is a sectional view taken through a short arcuate length of the turbine disc rim and adjacent turbine construction wherein an essential feature of this invention is illustrated;

FIG. 2 is a sectional view showing a modified construction using long-shank sheet metal buckets in place of the hollow cast buckets of FIG. 1;

FIG. 3 is a sectional view showing long-shank sheet metal buckets with provisions for cooling fluid distribution to the underside of the bucket platforms for cooling thereof;

FIG. 4 is a transverse sectional view through the turbine rotor taken on line 4—4 of FIG. 1, the turbine buckets not being provided with any shroud and provisions being made for air cooling of the bucket platforms, if desired;

FIG. 5 is a sectional view taken on line 5—5 of FIG. 4 and shows an example of the distribution pattern for several cooling fluid nozzles relative to the bucket scoops;

FIG. 6 is a transverse sectional view similar to FIG. 4 wherein the turbine buckets are provided with a shroud and scoop;

FIG. 7 is a sectional view taken on line 7—7 of FIG. 6;

FIG. 8 is a transverse sectional view through the turbine rotor in an embodiment in which provisions are made for the simultaneous application of inwardly directed cooling liquid and outwardly distributed cooling liquid to achieve a substantially greater degree of cooling;

FIG. 9 is a transverse sectional view taken along a short arcuate length of turbine disc rim on line 9—9 of FIG. 8 showing one mode of distribution for outwardly directed liquid;

FIG. 10 is a sectional view taken on line 10—10 of FIG. 9;

FIG. 11 is a transverse sectional view of the turbine disc rim and bucket assembly showing a second mode of distributing outwardly directed liquid into the bucket platforms from the acceleration gutters;

FIG. 12 is a development of the bucket cascade of FIG. 11 illustrating one variation for the distribution channel system for cooling liquid to the turbine buckets;

FIG. 13 is a development of the bucket cascade of FIG. 11 illustrating a second variation for the distribution channel system for cooling liquid to the turbine buckets;

Figure 14:
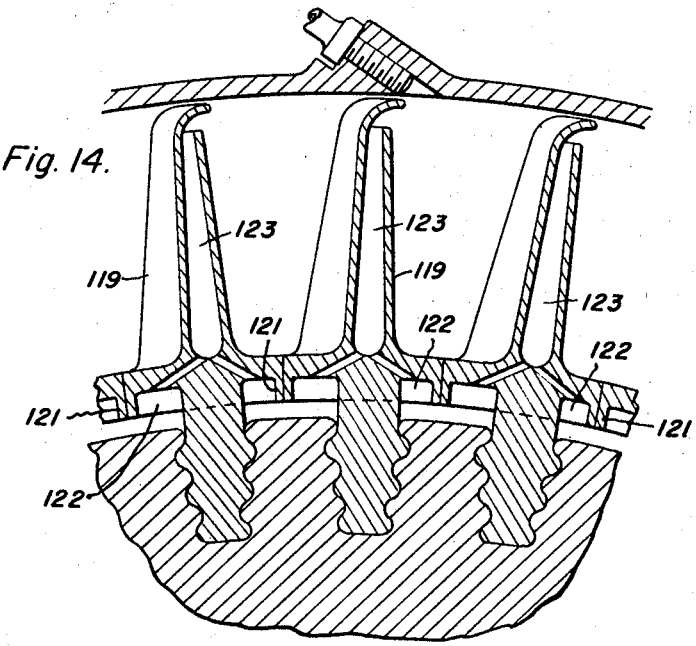
FIG. 14 is a sectional view showing forged or cast turbine bucket and platform construction with integrally formed gutters.

Referring to FIG. 1 the turbine buckets 11 to be cooled are shown as hollow forged or cast bodies fixed to the rim 12 of the turbine rotor disc 13 by any conventional means of attachment well known in the art. In place of the forged or cast buckets shown variations thereon may be employed, as for example, a forged or cast bucket dovetail and platform may have a hollow sheet metal bucket welded or brazed thereto with the dovetail portion being directly connected to the bucket platform or connected thereto by means of a long shank. Still another variation would be to weld or braze a hollow sheet metal bucket directly to the rim of the rotor disc. In each instance, however, the construction of the turbine bucket would differ from the conventional construction in that a projection, scoop 14 is provided along the rim of the pressure face of buckets 11, the sense of rotation of the rotor disc 13 being clockwise in the construction shown.

Cooling liquid in accordance with this invention is squirted in a solid stream from nozzle 16, which receives the liquid, preferably water, under pressure from pump 17. Nozzle 16 is stationary being mounted in casing 18 with the requisite angularity to insure that the aim of the solid stream of cooling liquid is such that an imaginary extension of the path of travel of the cooling stream would be tangent to the upper surface of the bucket platforms, since the cavities 19 should extend inwardly to this extent. As shown, a tolerance of about 10° deviation further in or further out may be tolerated. In those turbine constructions in which a dual casing (inner and outer) is employed, the coolant liquid nozzle 16 would be mounted in the outer casing with the solid stream of liquid being aimed through an opening in the inner casing with the direction of the stream being as described above. The solid stream of liquid is introduced through nozzle 16 under sufficient pressure to accelerate the liquid up to within about 500 feet per second of the full peripheral speed of buckets 11 at the angularity defined hereinabove and with less than 500 f.p.s. velocity differential between the water and the scoops erosion of the scoops is minimized.

Assuming a velocity differential (tangential component) exists between the speed of particles of liquid in the stream and each scoop 14 (moving at greater speed than the stream), scoop 14 catches up with such particles of water and redirects them (relative to bucket 11) into the cavity 19 with a radially inwardly directed force component. It is possible, of course, to (a) proportion the tip radius to the radius of the upper surface of bucket platforms 21, (b) vary the injection angle, (c) accelerate the incoming stream to a higher velocity closer to or equal to the bucket tip speed, (d) vary the bucket and cavity shapes and/or (e) vary the scoop shape and thereby achieve variations in the degree of redirection relative to each bucket 11 required by the scoops 14 and the extent to which the liquid is driven inwardly of the buckets. Thus, for example, it is possible to select from the above variables at least one set of conditions under which the nozzle 16 alone can so direct the incoming liquid at a speed at least equal to the bucket tip speed such that no redirection by scoops 14 is necessary to have the cooling liquid reach the desired depth in the cavities 19.

As the scoop 14 encounters the stream of liquid and drives the liquid radially inward this liquid very quickly transfers to the forward (suction) face of the cavity 19 due to the Coriolis force and clings thereto as it moves radially inward. After the given bucket has moved past the cooling water nozzle 16 sufficiently so that centrifugal force has overcome the inward velocity of the liquid, the liquid is slung out of cavity 19 in contact with the rearward (pressure) face of cavity 19 during its outward passage. Thereafter, if a plurality of cooling liquid nozzles 16 are disposed at intervals around the circumference of the casing 18, scoops 14 periodically pick up and reject charges of cooling liquid during each revolution. As a result of the action of the cooling liquid during transit in cavity 19 both the forward and rearward surfaces of cavity 19 become thoroughly wetted and result in effective cooling thereof. Scoops 14 are preferably, smoothly rounded to more advantageously effectuate the change in direction of the particles of cooling liquid and to minimize any erosion thereof.

In sequence any given droplet of cooling water admitted through nozzle 16 will enter cavity 19, bathe the inside surface thereof, be changed in part at least to steam, be slung out of cavity 19 and then carried downstream by the hot stream of motive fluid thereby contributing to the cooling of casing 18. However, it may be seen that additional cooling means such as is shown in FIG. 4 will have to be provided to insure cooling for the upper surface of bucket platforms 21, since the cooling liquid will not come in contact therewith.

The bucket construction shown in FIG. 2 is particularly applicable in this mode of cooling as it permits utilization of the modification shown in FIG. 3. In the construction shown in FIG. 2, the scoop-tipped long shank sheet metal buckets 22 are affixed to disc 23 at the thickened root portions 24 thereof as shown. By employing sheet metal bucket platforms 26 brazed or welded to buckets 22 a rigid, but light turbine rotor construction results. Also, as is shown in FIG. 3, the undersides of platforms 26 may be effectively cooled by the introduction of internally located scoop 27 in each cavity 28 so as to distribute the cooling liquid out through holes 29 around the interior of the underside of platform 26 and then back through the forward wall of bucket 22 via holes 31 for discharge thereof from cavity 28 up the rearward face of the scoop-tipped bucket under the influence of centrifugal force. The general pattern of circulation of the cooling liquid is shown by means of the arrows in FIG. 3.

The disposition of rotor disc 13 relative to the other turbine components is shown in FIG. 4. The hot gases leave combustor 32 and, after being directed by nozzle partitions 33, impinge upon buckets 11 thereby producing the rotation of disc 13 and transmitting force to shaft 34. In the construction of the nozzle diaphragm 36 shown in FIG. 4, cooling of the bucket platforms 21 may be obtained by introducing cooling air through slot 37 extending around the periphery of the nozzle diaphragm 36. In FIG. 4, the sense of rotation is such that bucket 11 is moving toward the viewer and, as well, the stream of water from nozzle 16 is also directed toward the viewer.

FIG. 5 taken on line 5—5 of FIG. 4 indicates that various patterns of coverage of the bucket chord with the liquid stream introduced through nozzle 16 may be achieved; as an example, if three cooling liquid nozzles are employed and are equally spaced around the periphery of casing 18, one might be placed as indicated by arrow 38 on the centerline of scoops 14; a second may be located one-third of the way around the periphery of the casing in the general position of arrow 39, while ⅔ of the way around the casing the third nozzle 16 could be located as shown by arrow 41. In this way, full coverage of the bucket chord may be secured. Other arrangements of nozzles and numbers of nozzles may, of course, be employed.

If it should be desired to connect the distal ends of the turbine buckets with a shroud to minimize vibration and provide a more rigid structure, a construction such as is shown in FIGS. 6 and 7 may be employed wherein shroud 42 is provided with reenforcing flanges 43. By insuring effective cooling of shroud 42 and turbine buckets 44 a very close clearance (0.005 inch or less) can be employed between the edges of shroud 42 and the adjacent casing walls 46, 47. Further, in the event it is critical to minimize any leakage of cooling liquid from annular chamber 48 into the hot gas stream, the edges of shroud 42 may be made to engage a labyrinth seal (not shown) at the casing walls 46, 47. In this construction the cooling liquid may be largely confined to annular chamber 48 and, therefore, auxiliary cooling means, such as a water jacket, will have to be provided to cool casing 49 and cooling of the platforms 51 will have to be provided as in FIG. 4. As in the embodiment of FIGS. 1 and 4, a stream of pressurized cooling liquid is introduced through each cooling liquid nozzle 52 and each bucket 44 is provided with a scoop 53 located and functioning in the same manner as in the aforementioned construction. Some provision must be made for the removal of heated liquid and vapor from annular chamber 48 and for this purpose a trap (not shown) would be located at the lowest point in chamber 48. Fluid removed in this manner can be conducted to a condenser and heat exchanger (not shown) and then returned to the turbine for reintroduction through nozzles 52 under pressure. If desired, of course, evaporated coolant withdrawn from chamber 48 could be conducted to a steam turbine (not shown) in order to recover heat loss by expansion of this evaporated coolant.

In the event it is desired to operate at a turbine inlet temperature in excess of about 2100° F. and at turbine bucket tip speeds ranging from about 1000 f.p.s. to about 1500 f.p.s., the aforementioned arrangement and method of liquid cooling may be very substantially augmented by coupling therewith a system for distributing cooling liquid from within the turbine. Such a composite cooling construction is shown in FIG. 8. In addition to the solid stream of pressurized cooling liquid introduced via each nozzle 56 cooling liquid is also introduced at low pressure at stationary cooling nozzles 57, 58. It is possible that in some constructions it will not be possible to locate a low pressure nozzle on each side of rotor disc 59, however, this is the preferred construction. The low pressure liquid coolant spray leaving nozzles 57 and 58 impinge upon the outer rim of rotor disc 59 and the underside of bucket platforms 61. Stationary annular discs 62 and 63 supporting nozzles 57 and 58, respectively, are provided with projecting annular ridges 64, 66. Also, each bucket platform 61 is provided with downwardly extending lip portions 67, 68, which in the constructions shown are down-turned sheet metal continuations of the bucket platform skin 69.

Thus, circumferentially extending gutters 71, 72 are provided on each side of rotor disc 59 and cooling liquid introduced through nozzles 57, 58 accumulates under overlapping portions 73, 74 of bucket platforms 61 under the influence of centrifugal force. While in the gutter regions 71, 72 the accumulating liquid cools the parts with which it comes into contact and is retained until it has been accelerated to the prevailing disc rim velocity. Definition of the gutter regions depends primarily on the utilization of radially inwardly directed flange portions or lips as for example elements 67 and 68 with overlapping platform portions 73, 74. Ridges 64, 66 aid in the further definition of gutters 71 and 72 directing the coolant stream into the gutters and away from the clearance spaces 75, 75a.

After the cooling liquid in gutter regions 71, 72 has been accelerated to the prevailing disc rim velocity, this liquid continually drains from regions 71, 72 in a radially outward direction under the influence of centrifugal force through bucket platforms 61 and thence into and through turbine buckets 76. In the construction shown in FIGS. 7, 8 and 9 this outward distribution of cooling liquid takes place through inlets 77, 78, 79 and 81 venting through the undersides of bucket platforms 61. From the inlets 77, 78, the liquid (still under the influence of centrifugal force) enters manifold 82. Similarly, liquid from inlets 79, 81 enters manifold 83. The manifolds 82, 83 are in flow communication with passages 84, 86, respectively, these passages being open at both ends and defined by a series of ribs 87, 88 forming part of core portion 89 of turbine buckets 76. Sheet metal skin 91 covering the radially-extending part of core 89 completes the definition of passages 84, 86. As with all other turbine buckets employed in the practice of this invention, the cooling liquid passes into each turbine bucket and after traversing in a radially outward direction therethrough the liquid and vapor phase generated therefrom are expelled from the open distal end of each bucket thereby preventing the buildup of hydrostatic forces, which would necessitate compensatory design allowances.

Thus, coolant liquid introduced from high pressure nozzle 56 will be urged in a radial direction into passages 84, 86 by scoops 92 as in a given bucket 76 passes a given nozzle 56. At the same time, liquid coolant liberated internally is proceeding in the radially outward direction in passages 84, 86. At various locations along passageways 84, 86 (or other cavities employed in various other designs of turbine buckets) these coolant flows will encounter each other with the inevitable result that all portions of the interior surfaces of any cavities of this sort will receive cooling liquid. In order to minimize the possibility of loss of liquid coolant between bucket platforms 61 and the stationary structure to each side thereof, very tight clearances may be employed (of the order of 0.005 inch or less), because of the effective cooling action provided. Further, to equalize pressure on opposite sides of rotor disc 59 and prevent having cooling liquid blown back out of downstream inlets 78, 79, one or more pressure relief holes 93 are provided through rotor disc 59. The supply lines leading to nozzles 57, 58 enter the system through stationary portions of the turbine and, therefore, pass through structure easily cooled by conventional methods. As an illustration, cooling water is shown passing through passage 94 around the combustor 96 and entering the nozzle diaphragm 97 to which stationary annular disc 62 is affixed. Thereafter, the cooling water passes through the nozzle partitions 98 and then returns via passage 99 as shown.

An alternate construction (not shown) may be used in place of pressure relief holes 93 shown in FIG. 8. In such an arrangement the radially inwardly extending annular lip 67 would form one side of an annular recess formed in the underside of platforms 61. A radially outwardly extending flange affixed to or formed integral with disc 62 would project into the aforementioned recess enabling the formation of an annular liquid seal during operation both to prevent leakage and to prevent creation of a pressure difference across the disc.

FIGS. 11, 12 and 13 illustrate other distribution channel arrangements for the passage of cooling liquid, such as water, from the gutter regions 103 and 104 into and through the interior of bucket platforms 106 in transit to and through the turbine buckets 107. Platform 106 is cast as an integral part of the rotor disc and is formed with an undulating upper surface with ridges 108. Buckets 107 fit into slots cut transversely of ridges 108 and are brazed to platforms 106. Platform skin 109 is affixed to the ridge 108 of the platform 106 as shown and thereby defining passageways 111, 112 and 113. Inlet holes a, b, c, d may be conveniently located to distribute cooling liquid to these passageways from gutters 103, 104 for transit to and through cooling holes 114 extending through the shell of the buckets 107. If desired, additional inlet holes 116, 117 may be provided extending from the underside of platform 106 directly into the interior of buckets 107 in the leading and trailing edges of bucket 107 as shown in FIG. 13. Further, if a simpler distribution network is preferred the diagonally extending inlets, which lead to passageway 112 may be eliminated and, as well the two cooling holes 114 leading from passageways 111 and 113 to the interior of bucket 107 and providing instead crossover channels (not shown) transverse of ridges 108 leading from passageways 111 and 113 to passageways 112 and passageway 112 having the sole cooling hole 114 extending into the interior of hollow bucket 107 with or without the additional inlet holes 116 and 117. With this latter modification cooling liquid may be admitted from one side only of the rotor disc 118 and still achieve relatively effective cooling of the platform 106.

Of course, the same distribution channel arrangement as is shown in FIGS. 11, 12 and 13 can be employed with turbine construction in which individual turbine buckets are affixed to the rotor disc by means of dovetailing root construction.

If it is desired to equip turbine buckets 76 (FIG. 8) or 107 (FIG. 11) with a shroud in the general manner described in FIG. 6, it is merely necessary to supply a closed annular chamber similar to annular chamber 48 and to relocate nozzle 56 to a position analogous to that of nozzle 52.

Figure 15:
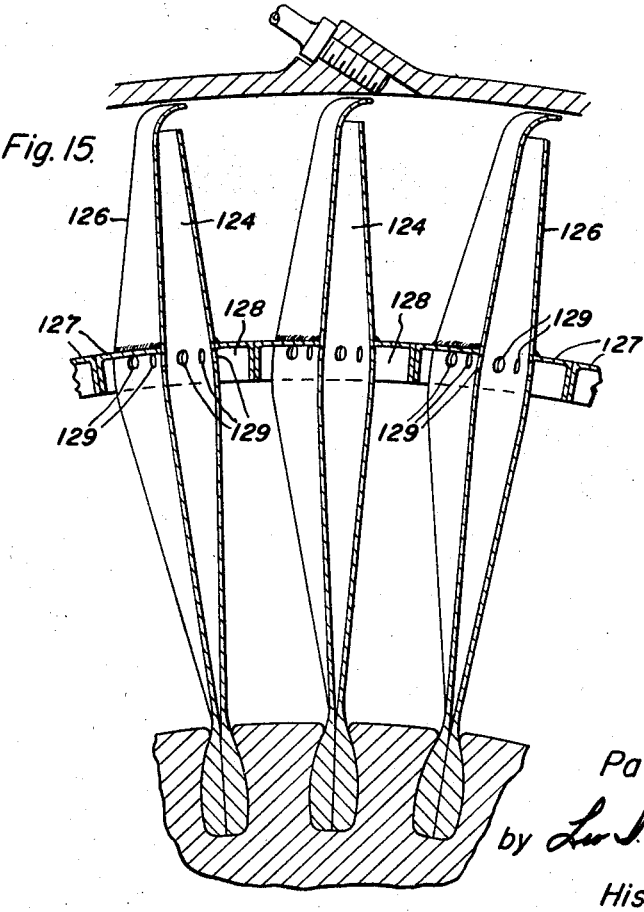
FIG. 15 is a sectional view showing a long shank sheet metal bucket and platform construction with an integral gutter.

By supplying each individual turbine bucket with a downwardly extending skirt around the entire perimeter of the bucket platform, each turbine bucket is supplied with an integral gutter region in the manner shown in FIGS. 14 and 15. Thus, in FIG. 14 each scoop-tipped forged or cast hollow bucket 119 is provided with downwardly extending skirt portion 121 defining gutter region 122 from which cooling liquid is distributed to the cavity 123 by the passages shown. The sheet metal bucket configuration disclosed in FIG. 15 appears to be similar to the construction shown in FIG. 3, however, no scoop is located within cavity 124 of scoop-tipped bucket 126, cooling liquid being distributed to the platform 127 from outside, rather than from inside bucket 126. This construction, likewise, provides individual gutter 128 defined by the downwardly extending sides of sheet metal platform 127. The water received by and contained in gutter 128 passes into cavity 124 under the influence of centrifugal force through drain holes 129.

Manifestly, the provision in the above-described system for the outwardly directed dispersal of cooling liquid considerably complicates the turbine construction beyond the structure required for inward liquid spray cooling, however, the allowable bucket tip speeds and cooling water flow rate inherent in the inward liquid spray cooling arrangement are increased. Of course, it is possible to use either the inward liquid spray cooling or the outward distribution of cooling liquid separate from the other and either may be employed to augment the cooling capacities of the other depending upon the turbine inlet temperatures being employed at the time. It is contemplated that this augmentation may be automatically controlled as a function of the rotational speed of the turbine rotor disc or other parameter.

Thus, a construction and arrangement for inward cooling has been disclosed herein enabling the utilization of turbine bucket tip speeds of up to about 1500 f.p.s. and turbine inlet temperatures up to about 2100° F. Also, a cooling system for the combined utilization of both inward and outward liquid cooling has been disclosed whereby successful cooling for turbines may be achieved at bucket tip speeds up to about 1500 f.p.s. and turbine inlet temperatures extending from about 2100° F. to about 3000° F. For those constructions in which it is desired to operate with a bucket tip speed greater than 1500 f.p.s. and at a turbine inlet temperature ranging from about 2100° F. to about 3000° F., it is recommended that the outwardly directed liquid cooling arrangement disclosed in U.S. application Ser. No. 625,745, Kydd, filed concurrently with the instant application and assigned to the assignee of the instant application be employed.

Certain of the novel features hereinabove disclosed may be utilized without others and variations may be resorted to within the scope of the appended claims without departing from the spirit of the invention.

What I claim as new and desire to secure by Letters Patent of the United States is:

1. A gas turbine construction comprising in combination:
    (a) a casing,
    (b) a shaft mounted for rotation in said casing,
    (c) a turbine disc mounted on said shaft for rotation therewith, said turbine disc extending substantially perpendicular to the axis of said shaft,
    (d) turbine buckets mounted on the outer rim of said turbine disc and extending in a generally radially outward direction from said rim,
    (e) at least one longitudinally extending cavity in each of said turbine buckets, each of said cavities having an opening venting said cavity near the radially outward end of the given turbine bucket in which it is located and extending along the generally radial dimension of said given turbine bucket for at least about the distance that said turbine bucket would be exposed to the turbine motive fluid,
    (f) means for injecting a high pressure stream of cooling liquid inwardly through the wall of said casing in a direction to merge into the path of rotation of said turbine buckets and proceed substantially tangential to the substantially cylindrical surface area from which said turbine buckets project,
    (g) means extending generally transverse of the path of rotation of said turbine buckets for redirecting liquid from said stream into each of said cavities, the redirection of liquid into any given cavity being in the generally radially inward direction relative to said given cavity,
        (1) said redirecting means being located near the radially outward end of each of said turbine buckets and rotating therewith, and
    (h) means connected to said injecting means for supplying cooling liquid under pressure thereto.

2. The gas turbine construction substantially as recited in claim 1 wherein the cavities in the turbine buckets vent from near the radially outer ends of said turbine buckets into an annular chamber defined by the casing and a bucket shroud interconnecting the radially outward ends of said turbine buckets.

3. The gas turbine construction substantially as recited in claim 2 wherein each redirecting means is an outwardly extending projection affixed to the bucket shroud and presenting a curved surface adjacent at least one turbine bucket cavity opening.

4. The gas turbine construction substantially as recited in claim 1 wherein each turbine bucket has as a part of the distal end along the pressure side thereof, a wall projecting beyond and over the opening venting said cavity at the radially outward end thereof presenting a curved surface in juxtaposition to said opening.

5. The gas turbine construction substantially as recited in claim 1 wherein the turbine buckets are hollow with relatively thin walls presenting the pressure and suction surfaces.

6. The gas turbine construction substantially as recited in claim 5 wherein diverting means are located within the hollow turbine bucket to lengthen the circulatory path of cooling liquid driven down into the cavity by the redirecting means.

7. A gas turbine construction comprising in combination:
    (a) a casing,
    (b) a shaft mounted for rotation in said casing,
    (c) a turbine disc mounted on said shaft for rotation therewith, said turbine disc extending substantially perpendicular to the axis of said shaft,
    (d) turbine buckets mounted on the outer rim of said turbine disc and extending in a generally radially outward direction from said rim,
    (e) at least one longitudinally extending cavity in each of said turbine buckets, each of said cavities having an opening venting said cavity near the radially outward end of the given turbine bucket in which it is located and extending along the generally radial dimension of said given turbine bucket for at least about the distance that said given turbine bucket would be exposed to the turbine motive fluid,
    (f) first nozzle means for injecting a high pressure stream of cooling liquid inwardly through the wall of said casing in a direction to merge into the path of rotation of said turbine buckets and proceed substantially tangential to the substantially cylindrical surface area from which said turbine buckets project,
    (g) means for redirecting liquid from said stream into each of said cavities, the redirection of liquid into any given cavity being in the generally radially inward direction relative to said given cavity,
        (1) said redirecting means being located near the radially outward end of each of said turbine buckets and rotating therewith,
    (h) means connected to said first nozzle means for supplying cooling liquid under pressure thereto,
    (i) circumferentially extending platform structure having overhanging portions projecting laterally to either side of said turbine disc with the upstream circumferentially-extending edge of the overhanging portion on the upstream side of said turbine disc being adjacent the surface of the stationary structure supporting the nozzle partitions,
    (j) stationary second nozzle means at least some of which are supported by internally located portions of said stationary structure, said second nozzle means being located radially inwardly of said platform and being oriented to direct cooling liquid in a radially outward direction into the volume generally defined by said stationary structure, turbine disc and overhanging portions,
    (k) means connected to said second nozzle means for supplying cooling liquid at relatively low pressure thereto,
        (1) means projecting radially inwardly of at least one of said overhanging portions for defining at least one gutter region in cooperation with said at least one overhanging portion wherein cooling liquid ejected from said second nozzle means is received and accelerated during rotation of said turbine disc,
    (m) coolant supply ducts extending from said gutter region through said platform and into the cavity construction near the radially inner extent thereof.

8. The gas turbine construction substantially as recited in claim 7 wherein the turbine buckets are hollow with relatively thin walls presenting the pressure and suction surfaces.

9. The gas turbine construction substantially as recited in claim 7 wherein a stationary annular rim projects in the axial direction under at least one overhanging portion of the platform and cooperates with the gutter-defining means projecting radially inwardly of said one overhanging portion to more completely define a gutter region.

10. The gas turbine construction substantially as recited in claim 7 wherein the second nozzle means are located on both sides of the turbine disc and are oriented to direct cooling liquid to a plurality of gutter regions located under both the upstream and the downstream overhanging portions.

11. The gas turbine construction substantially as recited in claim 7 wherein the clearance between the upstream circumferentially-extending edge of the platform structure and the adjacent surface of the stationary structure supporting the nozzle partitions is small enough to substantially prevent the passage of fluid therethrough at operating temperatures.

12. The gas turbine construction substantially as recited in claim 7 wherein each turbine bucket has as part of the distal end along the pressure side thereof, a curved wall projecting beyond and over the opening venting said cavity at the radially outward end thereof.

13. A turbine bucket for use in a turbine, said bucket having an airfoil section, a leading edge and a trailing edge and having at least one longitudinally extending cavity therein, said cavity having an opening venting said cavity near the tip end of said bucket, and said bucket having an extension of the pressure side wall of said cavity projecting beyond and curving some distance over and above said opening to present a curved surface spaced from and in juxtaposition to said opening.

14. The turbine bucket substantially as recited in claim 13 wherein said bucket has a single large cavity defined by relatively thin walls on the pressure and suction sides thereof.

15. The turbine bucket substantially as recited in claim 14, said bucket having a long shank with the large cavity extending into said shank.

16. The turbine bucket substantially as recited in claim 13 wherein said bucket has an integral platform structure projecting laterally from the longitudinal dimension of the cavity, said platform structure having a skirt-like peripheral surface defining a cup-like recess beneath the lateral projection thereof and at least one passage connecting said recess with the interior of said cavity.

17. A gas turbine construction comprising in combination:
(a) a casing,
(b) a shaft mounted for rotation in said casing,
(c) a turbine disc mounted on said shaft for rotation therewith, said turbine disc extending substantially perpendicular to the axis of said shaft,
(d) turbine buckets mounted on the outer rim of said turbine disc and extending in a generally radially outward direction from said rim,
(e) at least one longitudinally extending cavity in each of said turbine buckets, each of said cavities having an opening venting said cavity near the radially outward end of the given turbine bucket in which it is located and extending along the generally radial dimension of said given turbine bucket for at least about the distance that said given turbine bucket would be exposed to the turbine motive fluid,
(f) means for injecting a high pressure stream of cooling liquid inwardly through the wall of said casing in a direction to merge into the path of rotation of said turbine buckets and proceed substantially tangential to the substantially cylindrical surface area from which said turbine buckets project, and
(g) means connected to said injecting means for supplying cooling liquid under pressure thereto.

18. The gas turbine construction substantially as recited in claim 17 wherein the turbine buckets are hollow with relatively thin walls presenting the pressure and suction surfaces.

References Cited

UNITED STATES PATENTS

| | | |
|---|---|---|
| 2,786,646 | 3/1957 | Grantham. |
| 2,888,241 | 5/1959 | Stalker. |
| 2,945,671 | 7/1960 | Petrie. |
| 3,057,597 | 10/1962 | Meyer et al. |
| 3,286,461 | 11/1966 | Johnson. |
| 3,323,775 | 6/1967 | Snell. |

EVERETTE A. PAWELL, JR., *Primary Examiner.*

U.S. Cl. X.R.

253—77